United States Patent
Carey

(10) Patent No.: US 11,619,418 B2
(45) Date of Patent: Apr. 4, 2023

(54) AIR DIFFUSER

(71) Applicant: ILLINOIS TOOL WORKS INC., Glenview, IL (US)

(72) Inventor: John E. Carey, Ortonville, MI (US)

(73) Assignee: Illinois Tool Works Inc., Glenview, IL (US)

( * ) Notice: Subject to any disclaimer, the term of this patent is extended or adjusted under 35 U.S.C. 154(b) by 667 days.

(21) Appl. No.: 16/599,196

(22) Filed: Oct. 11, 2019

(65) Prior Publication Data

US 2020/0124316 A1 Apr. 23, 2020

Related U.S. Application Data

(60) Provisional application No. 62/746,715, filed on Oct. 17, 2018.

(51) Int. Cl.
*F24F 13/065* (2006.01)
*F24F 13/08* (2006.01)
*B60H 1/34* (2006.01)

(52) U.S. Cl.
CPC .......... *F24F 13/065* (2013.01); *F24F 13/082* (2013.01); *B60H 1/3414* (2013.01)

(58) Field of Classification Search
CPC ...... F24F 13/065; F24F 13/082; B60H 1/3414
USPC ....................................................... 454/155
See application file for complete search history.

(56) References Cited

U.S. PATENT DOCUMENTS

| | | | | |
|---|---|---|---|---|
| 2,232,573 A * | 2/1941 | Teves | ..................... | F24F 13/065 239/524 |
| 2,367,104 A * | 1/1945 | Demuth | ................ | F24F 13/062 74/531 |
| 2,672,806 A * | 3/1954 | Vehige | ..................... | F16K 27/02 251/351 |
| 3,292,522 A * | 12/1966 | Solshur | ................ | F24F 13/062 454/302 |
| 3,765,316 A * | 10/1973 | Skoch | ..................... | F24F 13/16 251/318 |
| 2005/0227609 A1 * | 10/2005 | Koessler | ............... | F24F 13/062 454/300 |

FOREIGN PATENT DOCUMENTS

| | | |
|---|---|---|
| DE | 10242805 A1 | 9/2003 |
| DE | 102008002958 B3 | 10/2009 |
| EP | 2481999 A1 | 8/2012 |

\* cited by examiner

*Primary Examiner* — Allen R. B. Schult
(74) *Attorney, Agent, or Firm* — Quarles & Brady LLP

(57) ABSTRACT

An air register can control airflow direction and intensity. The air register includes an attachment mechanism that is configured to attach to a surface. The air register further includes a plurality of diffuser discs attached to the attachment mechanism and configured so that they may be manually moved from a closed configuration to an open configuration. The diffuser discs include a plurality of apertures that allow air to flow therethrough. In the closed configuration, the diffuser discs are arranged to cover the apertures so that air cannot flow therethrough. In the open configuration, the plurality of diffuser discs are spaced apart to allow air to flow through the apertures. Further, the diffuser discs can be tilted to control airflow direction.

20 Claims, 7 Drawing Sheets

AIR DIFFUSER

CROSS-REFERENCES TO RELATED APPLICATIONS

This application claims the benefit of U.S. Provisional Application No. 62/746,715 filed on Oct. 17, 2018, which is hereby incorporated by reference in its entirety.

FIELD OF THE DISCLOSURE

Embodiments of the present disclosure generally relate to air registers and, more particularly, to air registers that have mechanisms to regulate an amount and direction of air flow.

BACKGROUND

Generally, in many applications, air registers may be configured to control direction and intensity of airflow therethrough. For example, air registers may use pivotable flaps and panels to obstruct and permit airflow therethrough. Further, air registers may be rotatable or pivotable to control airflow direction.

SUMMARY

In one aspect, an air register may include an attachment member configured to be attached to a surface, a first diffuser disc coupled to the attachment member, a tilt member coupled to the first diffuser disc, and a second diffuser disc coupled to the tilt member. The first diffuser disc may include at least one first diffuser disc aperture extending therethrough. The second diffuser disc may be configured to cover the at least one first diffuser disc aperture when in a closed position and be spaced from the first diffuser disc when in an open position. Further, the tilt member may allow for rotation and tilting of the second diffuser disc.

In another aspect, an air register may include an attachment member configured to be attached to a surface, a first diffuser disc coupled to the attachment member, a tilt member coupled to the first diffuser disc, a second diffuser disc including at least one second diffuser disc aperture extending therethrough, and a third diffuser disc member coupled to the second diffuser disc. The first diffuser disc includes at least one first diffuser disc aperture extending therethrough. The tilt member may be a tilt ring that includes a central circular aperture, two semi-circular apertures, and at least one slot positioned between the tilt ring semi-circular apertures. The second diffuser disc is coupled to the tilt member and configured to cover the at least one first diffuser disc aperture when in a closed position and be spaced from the first diffuser disc when in an open position. The third diffuser disc member is configured to cover the at least one second diffuser disc aperture when in the closed position and be spaced from the second diffuser disc when in the open position. Further, the tilt member allows for rotation and tilting of the second diffuser disc and the third diffuser disc.

In another aspect, an air register may include an attachment member, a first diffuser disc, a tilt member, a second diffuser disc, and a third diffuser disc. The attachment member is configured to be attached to a surface. Further, the attachment member may be an attachment ring that includes a cylindrical wall with a lip extending outwardly from a first end thereof. The cylindrical wall is configured to be inserted into and retained within a cavity, and the lip is configured to abut the surface. The first diffuser disc is coupled to the attachment member, and includes at least one first diffuser disc aperture that is formed by a cylindrical flange that extends inwardly from the first diffuser disc. The tilt member is coupled to the first diffuser disc. Further, the tilt member may be a tilt ring that includes a central circular aperture, two semi-circular apertures, and at least one slot positioned between the tilt ring semi-circular apertures. The second diffuser disc includes at least one second diffuser disc aperture and two semi-circular apertures extending therethrough. The two semi-circular apertures may be positioned on opposing sides of the second diffuser disc aperture. Furthermore, the second diffuser disc may be coupled to the tilt member and configured to cover the at least one first diffuser disc aperture when in a closed position and be spaced from the first diffuser disc when in an open position. The third diffuser disc member may be coupled to the second diffuser disc and configured to cover the at least one second diffuser disc aperture when in the closed position and be spaced from the second diffuser disc when in the open position. The third diffuser disc includes an inner surface, an outer surface, and a third diffuser disc latch that extends from the inner surface and through the second diffuser disc aperture. The third diffuser disc further includes a knob that is configured to allow a user to pull the third diffuser disc outwardly from the second diffuser disc and the second diffuser disc outwardly from the first diffuser disc, which arranges the air register in the open position. Further, the tilt member may allow for rotation and tilting of the second diffuser disc and the third diffuser disc.

Figure 1:
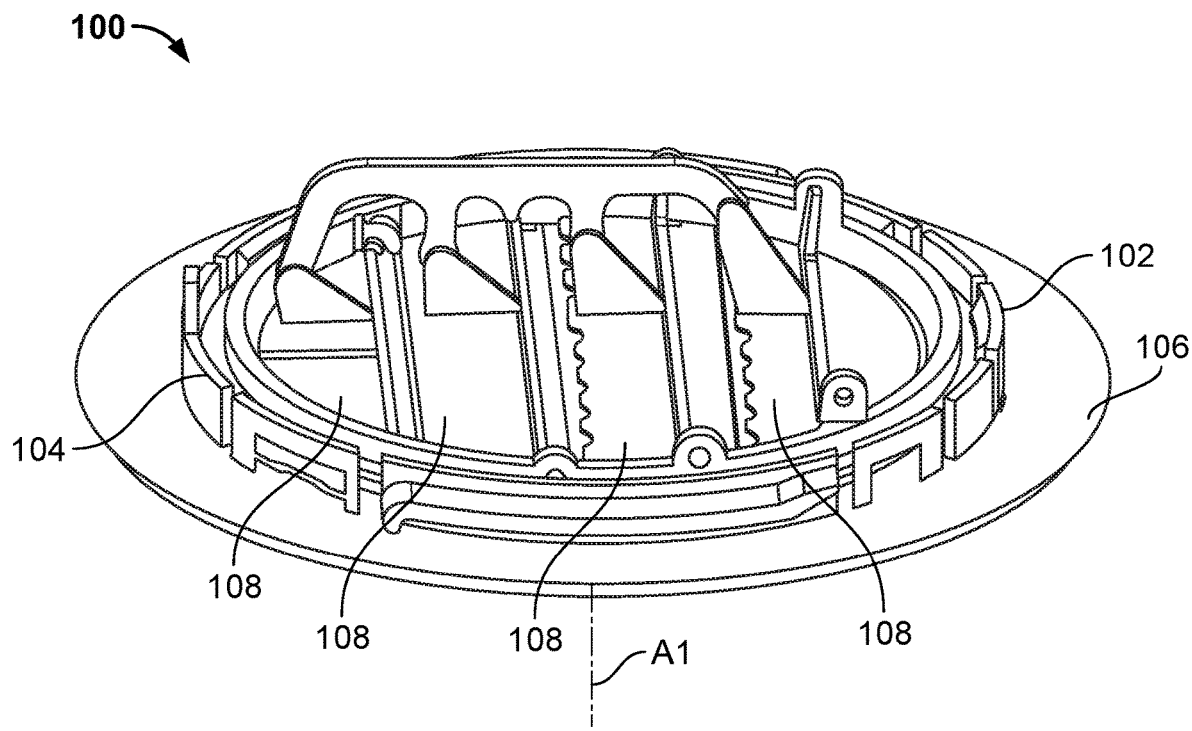
FIG. 1 is a rear perspective view of a prior art air register.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION

Figure 2:
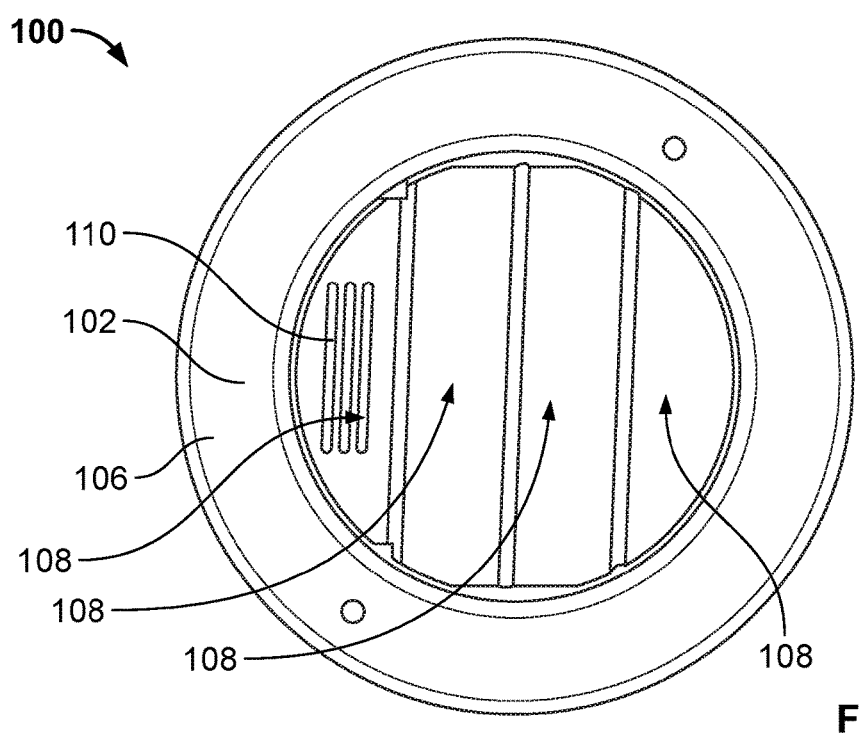
FIG. 2 is a front elevational view of the prior art air register of FIG. 1.
Figure 3:
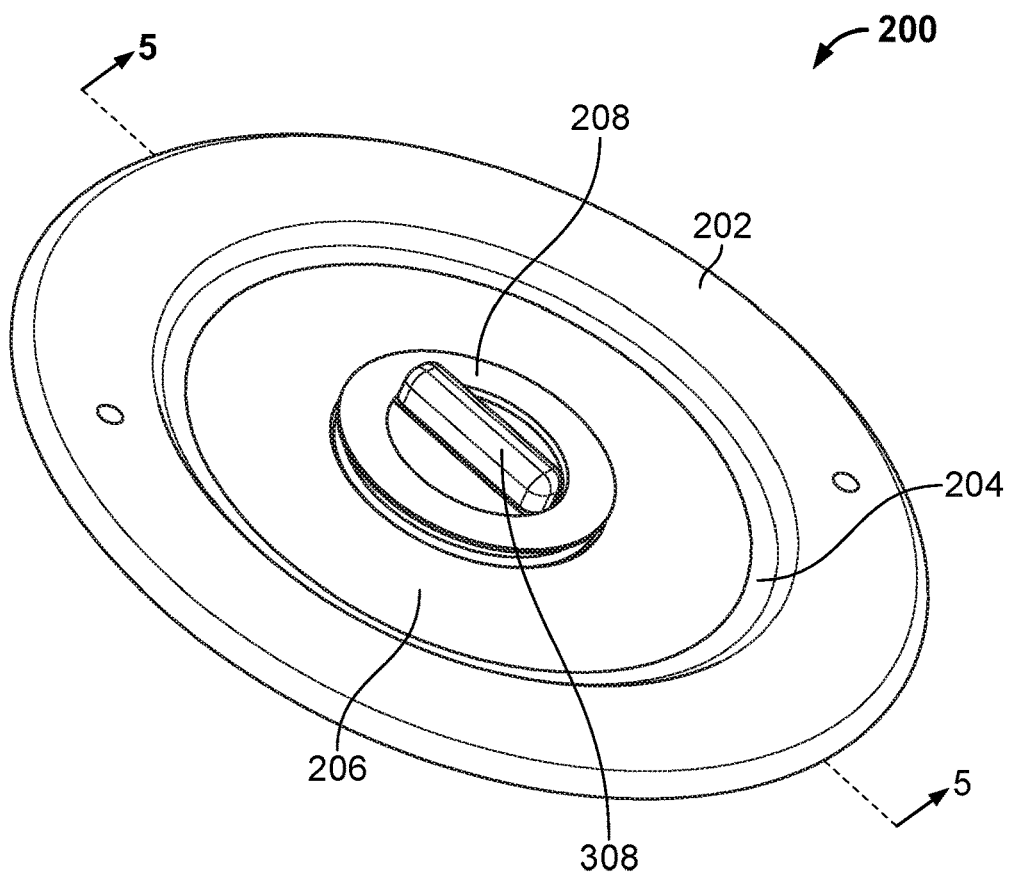
FIG. 3 is a front perspective view of an air diffuser according to the present disclosure.

As noted above, in some instances, air registers are used to control airflow direction and intensity. Air registers are commonly used in automotive applications. For example, conventional air registers 100 in vehicles, as seen in FIGS. 1 and 2, generally include an attachment ring 102 that is inserted into a cavity of the vehicle, for example, in the headliner, a side panel, or any other portion of the vehicle. The attachment ring 102 may generally include a cylindrical wall 104 with a lip or flange 106 extending outwardly from a first or outer end of the cylindrical wall 104. The cylindrical wall 104 is configured to be inserted into and retained within the cavity, and the lip or flange 106 is configured to abut a surface of the vehicle surrounding the cavity.

The air register 100 further includes a plurality of vanes 108 that are manually rotatable from an open configuration to a closed configuration. As seen in FIGS. 1 and 2, the closed configuration is when the vanes 108 are generally parallel to the surface of the vehicle in which the air register 100 is installed. As a result, the vanes 108 do not allow (or substantially prevent) air to flow therethrough when in the closed configuration. Referring specifically to FIG. 2, a user may manually open the vanes 108 by pressing on one or more of the vanes 108, for example, at point 110, to crack or otherwise cause the vanes 108 to open. The vanes 108 rotate together to the open configuration (not shown). Once the vanes 108 begin to open, the user may grasp any one of the open vanes 108 and further open and/or close the vanes 108. Opening and closing the vanes 108 changes both an amount of airflow and a direction of airflow, although the airflow is always in a uniform direction. In some air registers 100, the entire air register 100 may be rotated about a longitudinal axis A1 of the air register 100 to allow for further directional variability of airflow, although again, the airflow is always in the same direction.

The air register 100 thus provides directed airflow. However, in some instances, it may be desirable to have diffused airflow. That is, it may be desirable to have air that is gently released from a cavity of a vehicle. The present disclosure generally provides an air register for a vehicle that provides diffused air. Further, the present disclosure generally provides an air diffuser than can control air direction and intensity. Although aspects of the present disclosure are presented below in the context of air registers for automobiles, other configurations are possible. For example, the principles disclosed herein can be used with other type of vehicles, such as planes, boats, material handling vehicles, and so on. The principles disclosed herein may also be used for non-vehicle applications, such as in buildings.

Figure 4:
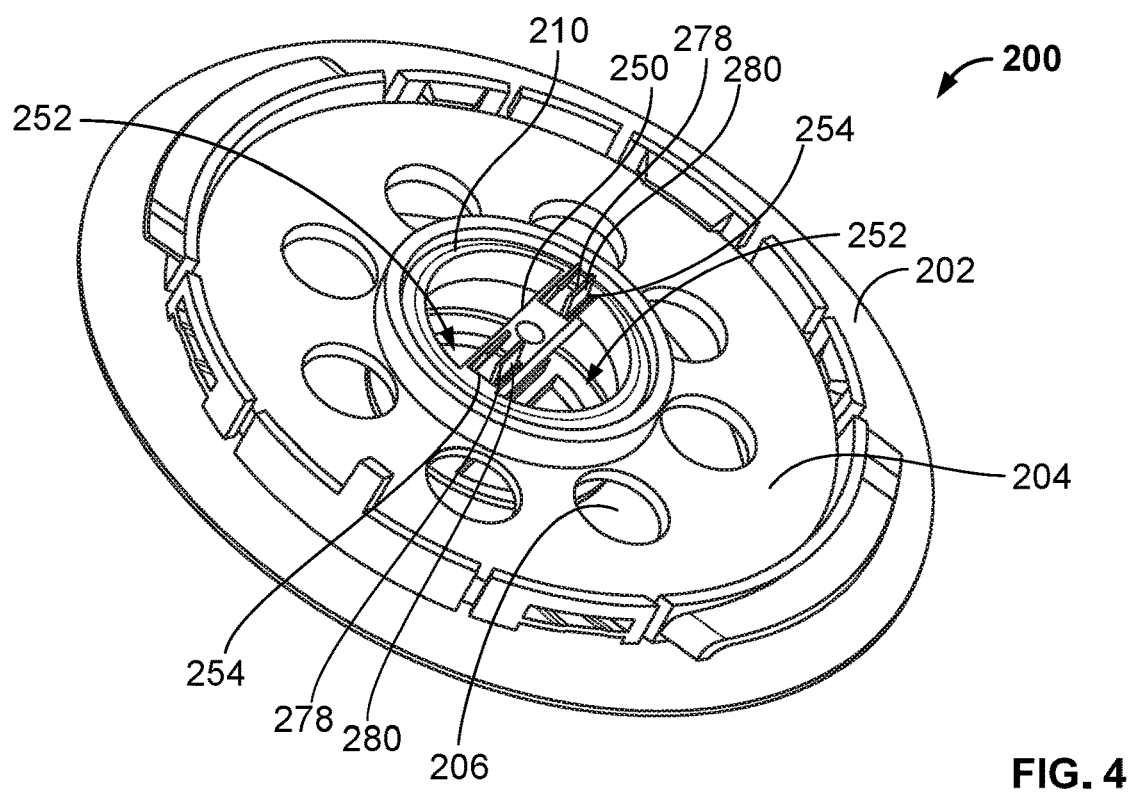
FIG. 4 is a rear perspective view of the air diffuser of FIG. 3 depicting various apertures through which air flows during operation.
Figures 5, 6:
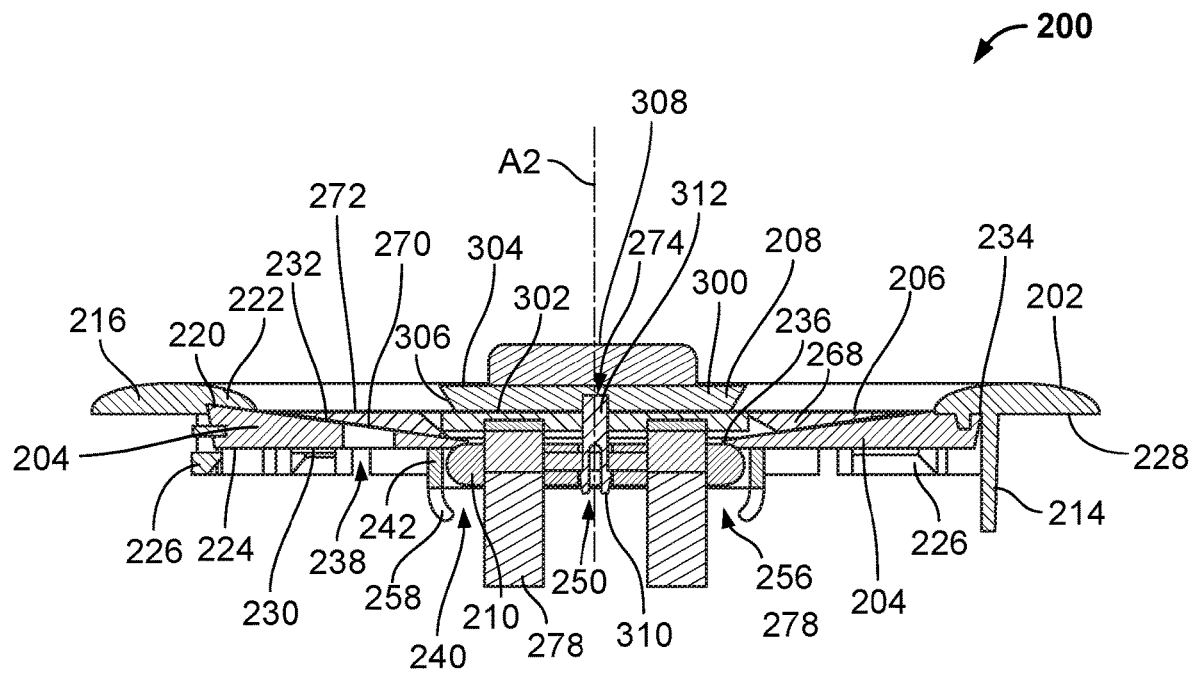
FIG. 5 is a cross-sectional view of the air diffuser of FIG. 3, taken generally along the lines 5-5 and depicting the air diffuser in a closed configuration.
FIG. 6 is a cross-sectional view of the air diffuser of FIG. 3, taken generally along the lines 5-5 and depicting the air diffuser in an open configuration.

Referring to FIGS. 3-12, the present disclosure generally provides an air register that is configured for coupling to a headliner, side panel, dashboard, or any other suitable surface in a vehicle (or other structure or surface). In the illustrated aspect, referring to FIG. 3, an air register in the form of an air diffuser 200 generally includes a body or attachment ring 202, a first diffuser disc 204, a second diffuser disc 206, a third diffuser disc 208, and a tilt ring 210 (see FIG. 4). Turning to FIG. 5, the attachment ring 202 generally includes a cylindrical wall 214 with a lip or flange 216 extending outwardly from a first end of the cylindrical wall 214. In some aspects, the attachment ring 202 may be identical or similar to the prior art attachment ring 102 of FIGS. 1 and 2. Further, the attachment ring 202 may be attached to a surface in any suitable manner, for example, via fasteners, adhesive(s), an interference fit, and/or other methods known in the art.

As best seen in FIGS. 5 and 6, the first diffuser disc 204 may be retained within the attachment ring 202. More particularly, the first diffuser disc 204 may be retained on an outer side 220 by a portion 222 of the flange 216 that extends inwardly from the cylindrical wall 214. The first diffuser disc 204 may be further retained on an inner side 224 by a plurality of ridges 226 extending inwardly from and spaced around the cylindrical wall 214. In some aspects, four equally-spaced ridges 226 may be used. In other aspects, any suitable number of ridges 226 may be used and may be equally or non-equally spaced. Regardless of the number of ridges 226, the first diffuser disc 204 is snapped into the attachment ring 202 from a rear or inner side 228 of the attachment ring 202.

Still referring to FIGS. 5 and 6, the first diffuser disc 204 is cylindrical in shape and generally includes a flat, inner wall 230 that is generally perpendicular to a longitudinal axis A2 of the air diffuser 200. The first diffuser disc 204 may further include an outer wall 232 that is angled from an outer edge 234 to an inner edge 236 such that a thickness of the first diffuser disc 204 is greater at the outer edge 234 than at the inner edge 236. A plurality of apertures 238 may extend through the first diffuser disc 204 between the inner and outer walls 230, 232 to allow for airflow therethrough. The first diffuser disc 204 may further include a central channel 240 that has a longitudinal axis coincident with the longitudinal axis A2 of the air diffuser 200. The central channel 240 may be formed by a cylindrical flange 242 that extends inwardly from the first diffuser disc 204. Further, the cylindrical flange 242 may be spaced inwardly from the inner edge 236 of the first diffuser disc 204, as will be discussed in more detail immediately below.

Figure 7:
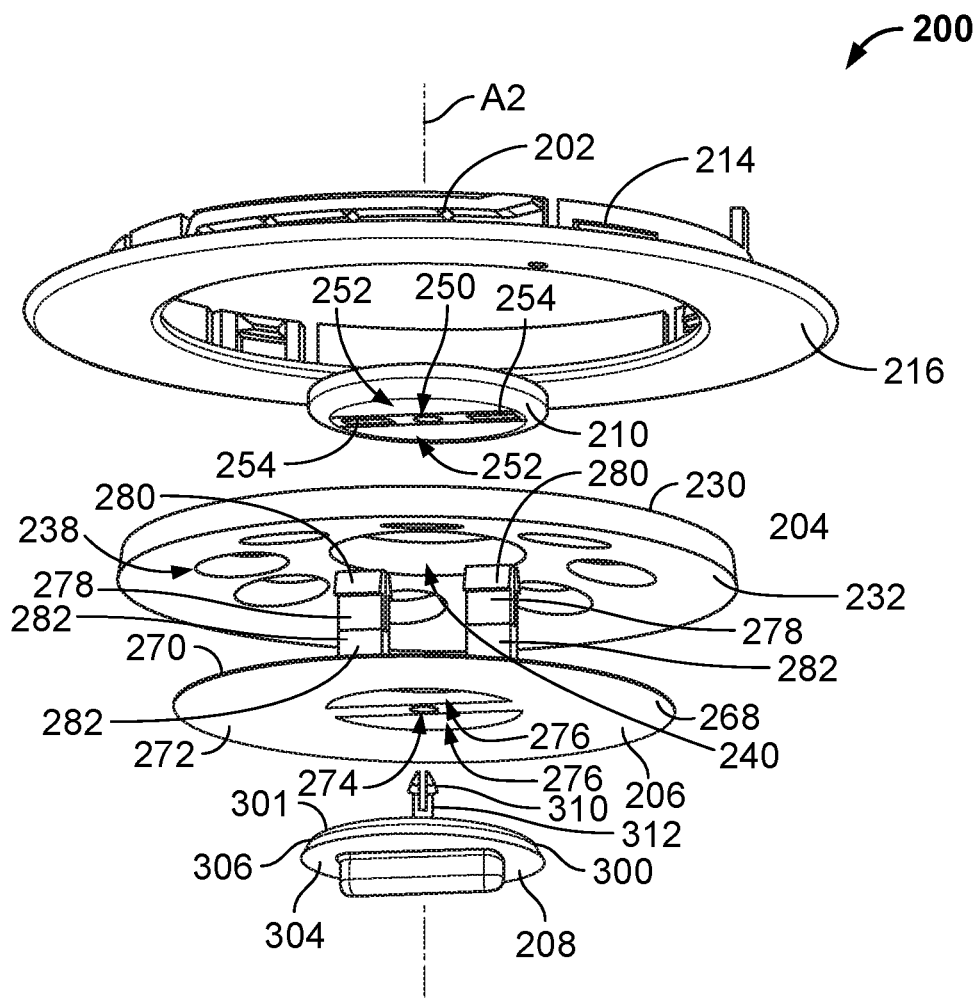
FIG. 7 is an exploded view of the air diffuser of FIG. 3.

Turning to FIG. 7, the tilt ring 210 may be positioned within the central aperture 240 of the first diffuser disc 204. The tilt ring 210 may include a central circular aperture 250 having a longitudinal axis that is coincident with the longitudinal axis A2 of the air diffuser 200, two semi-circular apertures 252 on opposite sides of the central circular aperture 250, and two slots 254 positioned on opposite sides of the central circular aperture 250 and between the semi-circular apertures 252. Returning to FIGS. 5 and 6, the tilt ring 210 may be captured in a cavity 256 between the inner edge 236 of the first diffuser disc 204 and a lip 258 formed at an inner end of the cylindrical flange 242, thereby securing the tilt ring 210 within the central channel 240. The cavity 256 may be sized such that the tilt ring 210 may be tilted, twisted, and angled within the cavity 256 to thereby change an angle of the tilt ring 210, and thus, an angle of the second and third diffuser discs 206, 208, as will be discussed in more detail below. The tilt ring 210 may also be rotated (about the longitudinal axis A2) to change a direction of airflow through the air diffuser 200.

Still referring to FIGS. 5 and 6, the second diffuser disc 206 may be circular in shape and generally includes a main body 268 with an angled inner wall 270 that conforms to the outer wall 232 of the first diffuser disc 204 and a flat, outer wall 272 that is generally perpendicular to the longitudinal axis A2 of the air diffuser 200. A circular aperture 274 may extend through a center of the second diffuser disc 206 and has a longitudinal axis that is coincident with the longitudinal axis A2 of the air diffuser 200. Referring again to FIG. 7, two semi-circular apertures 276 may extend through the second diffuser disc 206 and may be positioned on opposing sides of the circular aperture 274. Two legs 278 may extend rearwardly from the angled inner wall 270. Latches 280 may be positioned at distal ends of each of the legs 278, and detents 282 may be positioned between the distal and proximal ends of each of the legs 278. When the air diffuser 200 is assembled, as best seen in FIG. 4, the legs 278 may extend through the slots 254 in the tilt ring 210. The latches 280 may engage the tilt ring 210, which may prevent the second diffuser disc 206 from being removed from the tilt ring 210 and, thus, from the air diffuser 200. Returning to FIG. 7, the detents 282 may provide space for the second diffuser disc 206 to move relative to the tilt ring 210, which may allow the second diffuser disc 206 to open and close. More particularly, in an open position (see, e.g., FIG. 6), portions of the legs 278 proximate the latches 280 are positioned within the slots 254 of the tilt ring 210, whereas in a closed position (see, e.g., FIG. 5), portions of the legs 278 proximate the second diffuser disc 206 are positioned within the slots 254 of the tilt ring 210. Operation of the second diffuser disc 206 will be discussed in greater detail below.

Referring to FIGS. 5-7, the third diffuser disc 208 may have a generally frusto-conical body 300 having an inner surface 302 and an outer surface 304 with an angled wall 306 extending therebetween. A knob 308 may extend outwardly from the outer surface 304 to allow a user to pull portions of the air diffuser 200 outwardly and to further allow a user to twist and rotate the air diffuser 200, as will be discussed in greater detail below. A latch 310 may extend inwardly from the inner surface 302 and extends through the central circular aperture in the second diffuser disc 206. A length of the latch 310 may be great enough to allow inward and outward movement of the third diffuser disc 208 along the latch 310. The inner surface 304 of the frusto-conical body 300 may be configured to abut the second diffuser disc 208 and cover the semi-circular apertures 276 to prevent airflow therethrough.

In operation, the air diffuser 200 has a closed configuration, as seen in FIG. 5, in which the second diffuser disc 206 is positioned adjacent the first diffuser disc 204 to thereby cover the apertures 238 in the first diffuser disc 204 to prevent (or substantially prevent) airflow therethrough. In the closed configuration, the third diffuser disc 208 is also positioned adjacent the second diffuser disc 206 to thereby cover the semi-circular apertures 276 in the second diffuser disc 206. In this manner, no air (or substantially no air) is allowed to move through the air diffuser 200.

In some instances, when air vents or diffusers are in a closed configuration, air pressure can surge and cause the surrounding headliner or panel to balloon. Therefore, the air diffuser 200 according to aspects of the present disclosure may further include a pressure relief value to bleed any excess air and prevent pressure build-up.

Figure 8:
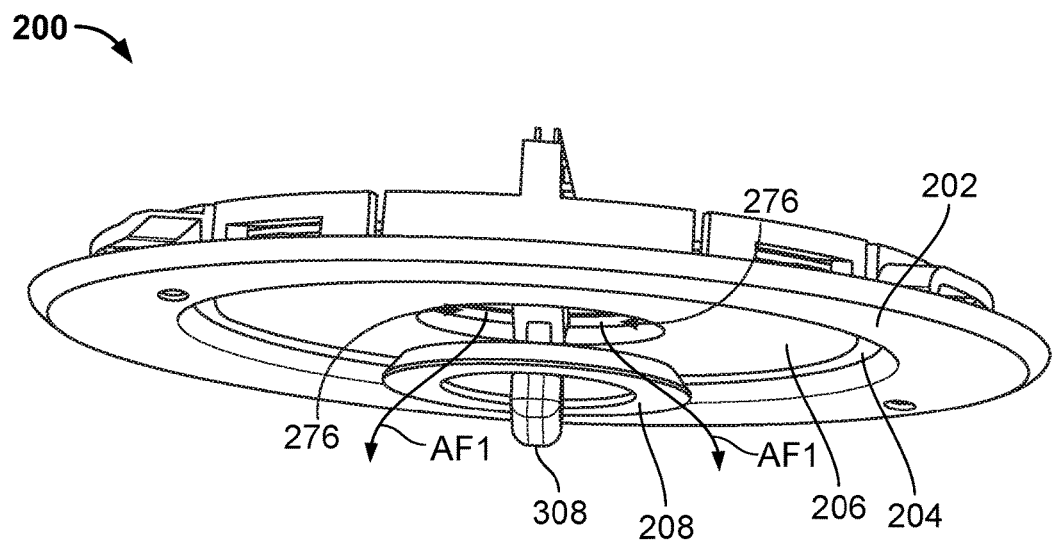
FIG. 8 is a perspective view of the air diffuser of FIG. 3 in a first stage of operation or opening.

In a first stage of opening the air diffuser 200, as seen in FIG. 8, a user may grasp and pull the knob 308 of the third diffuser disc 208 to begin to open the air diffuser 200. In the first stage of opening, the third diffuser disc 208 is pulled away from the second diffuser disc 206 to uncover the semi-circular apertures 276 and allow airflow therethrough. Airflow (AF1) may move through the semi-circular apertures 252 in the tilt ring 210 (see, e.g., FIG. 10), through the semi-circular apertures 276 in the second diffuser disc 206, and around the third diffuser disc 208, thereby creating a circular air flow, which diffuses the airflow and provides a greater area of coverage.

Figure 9:
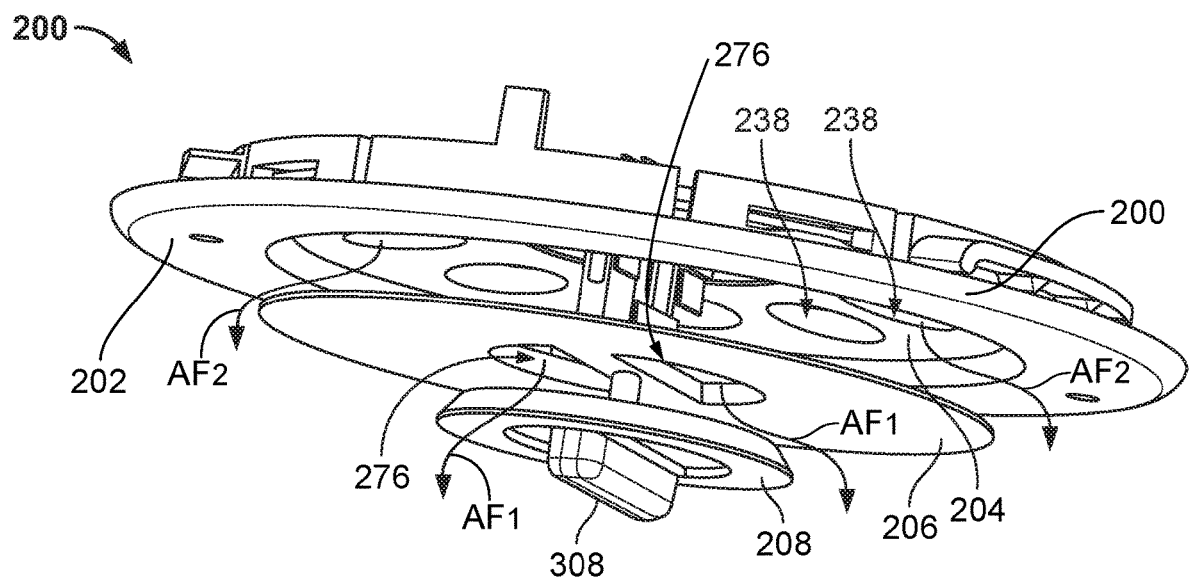
FIG. 9 is a perspective view of the air diffuser of FIG. 3 in a second stage of operation or opening.
Figure 10:
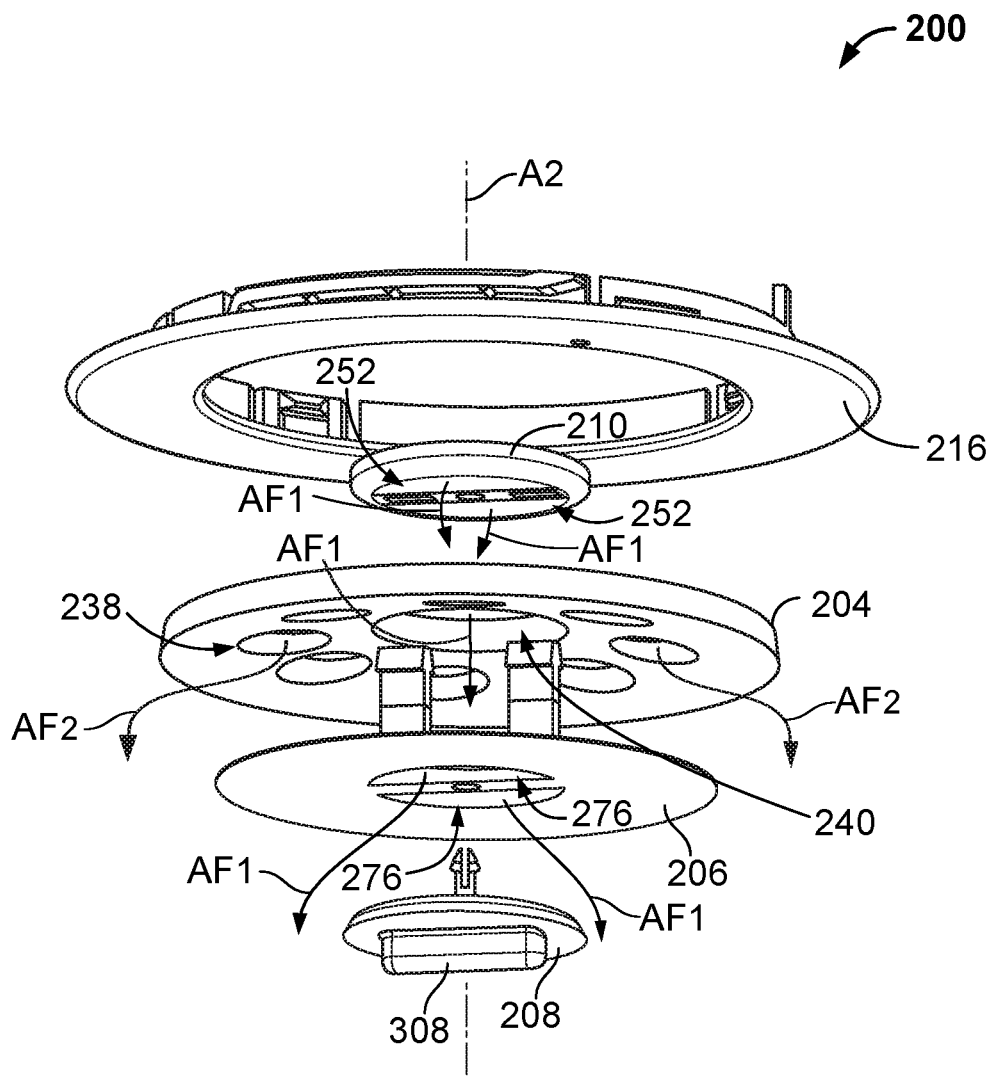
FIG. 10 is an exploded view of the air diffuser of FIG. 3 depicting paths of airflow.

In a second stage of opening the air diffuser 200, as seen in FIG. 9, the user may pull the knob 308 farther such that the second diffuser disc 206 is pulled away from the first diffuser disc 204 to uncover the apertures 238 in the first diffuser disc 204 and allow airflow therethrough. Airflow (AF1) may move through the semi-circular apertures 252 in the tilt ring 210 (see, e.g., FIG. 10), through the semi-circular apertures 276 in the second diffuser disc 206, and around the third diffuser disc 208. Furthermore, airflow (AF2) may flow through the apertures 238 in the first diffuser disc 204 and around the second diffuser disc 206 to further diffuse the airflow and provide an even greater area of coverage than in the first stage.

Although in the present aspect the knob 308 is configured to be pulled to separate the third air diffuser 208 from the second diffuser disc 206 and the second diffuser disc 206 from the first diffuser disc 204, other configurations are possible. For example, the knob 308 could be twisted to separate the third air diffuser 208 from the second diffuser disc 206 and the second diffuser disc 206 from the first diffuser disc 204. That is, the discs may be configured so that rotation results in linear translation along the longitudinal axis A2. Further, the first diffuser disc 204, the second diffuser disc 206, and the third air diffuser 208 may be components of a push-push mechanism. That is, when a force is applied into the knob 308, the first diffuser disc 204, the second diffuser disc 206, and the third air diffuser 208 may separate along the longitudinal axis A2.

Figure 11:
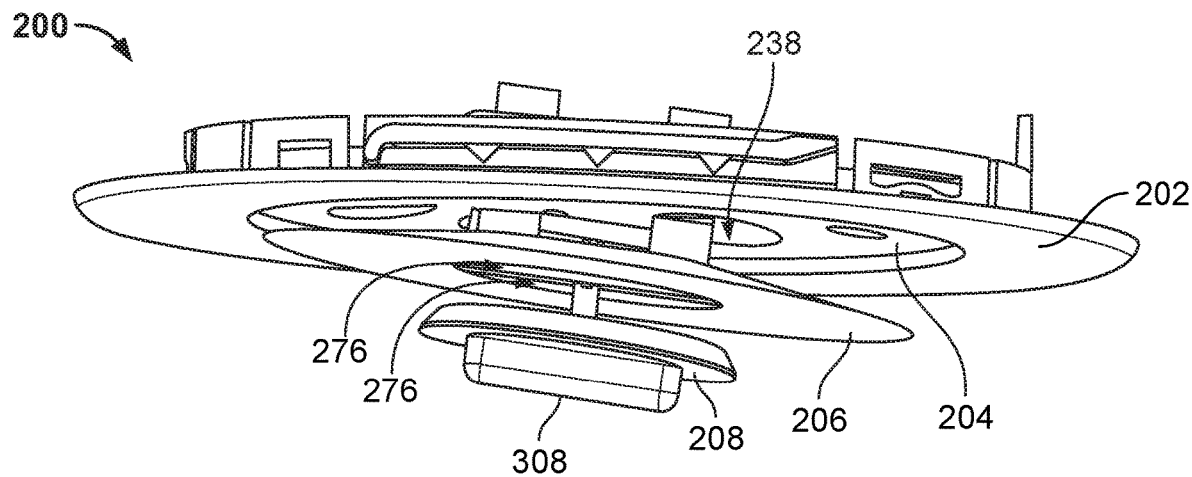
FIG. 11 is a perspective view of the air diffuser of FIG. 3 in the second stage of operation or opening and tilted to change a direction of airflow.

Referring now to FIG. 11, regardless of whether the air diffuser 200 is in the first or second stage of opening, the knob 308 maybe grasped and tilted and/or rotated to change a direction of airflow through the air diffuser 200. As noted above, the configuration of the cavity 256 in which the tilt ring 210 is positioned allows the tilt ring 210 and, thus, the second and third diffuser discs 206, 208 attached thereto to be twisted and tilted to change the direction of air flow by movement of the tilt ring 210.

Figure 12:
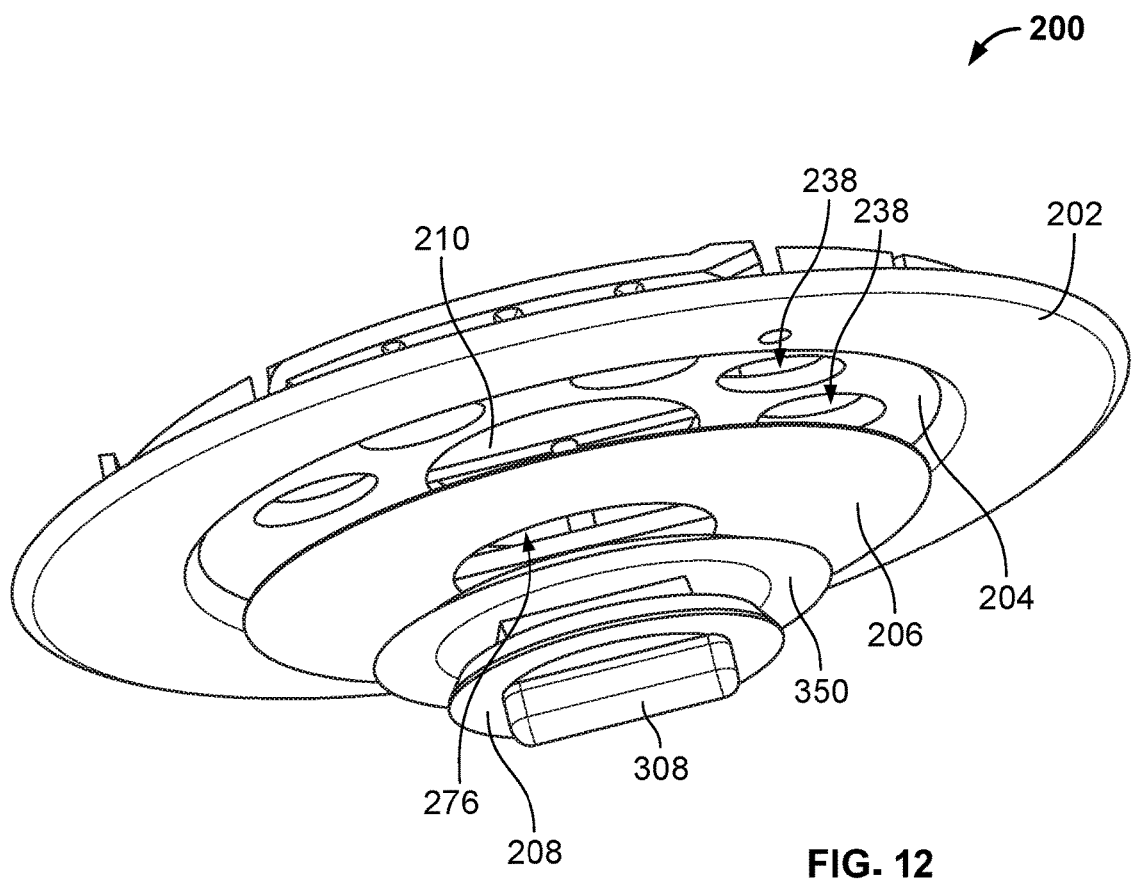
FIG. 12 is a perspective view of a further air diffuser according to the present disclosure.

While three diffuser discs 204, 206, 208 have been depicted herein, with two diffuser discs 206, 208 being moveable and rotatable and one diffuser disc 204 being stationary, it should be understood by one skilled in the art that any number of stationary diffuser discs and any number of moveable and/or rotatable diffuser discs may be utilized. In another exemplary embodiment, as seen in FIG. 12, a fourth diffuser disc has been added between the second and third diffuser discs 206, 208.

Still further, while the air registers in the form of air diffusers disclosed herein are shown as being generally circular in cross-section, the air registers/diffusers may have any suitable cross-sectional shape.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. An air register, comprising:
   an attachment member configured to be attached to a surface;
   a first diffuser disc coupled to the attachment member, the first diffuser disc including at least one first diffuser disc aperture extending therethrough;
   a tilt member coupled to the first diffuser disc within a central aperture thereof, wherein the tilt member is a tilt ring that includes tilt ring semi-circular apertures; and
   a second diffuser disc coupled to the tilt member and configured to cover the at least one first diffuser disc aperture when in a closed position and be spaced from the first diffuser disc when in an open position,
   wherein the tilt member allows for rotation and tilting of the second diffuser disc.

2. The air register of claim 1, wherein the at least one first diffuser disc aperture is formed by a cylindrical flange that extends inwardly from the first diffuser disc.

3. The air register of claim 1, wherein the first diffuser disc further includes a plurality of apertures extending therethrough, wherein the second diffuser disc is configured to cover the plurality of apertures when in the closed position.

4. The air register of claim 1, wherein the attachment member is an attachment ring that includes a cylindrical wall with a lip extending outwardly from a first end thereof, and wherein the cylindrical wall is configured to be inserted into and retained within a cavity in the surface, and the lip is configured to abut the surface.

5. The air register of claim 4, wherein the first diffuser disc is retained on an outer side thereof by a portion of the lip that extends inwardly of the cylindrical wall of the attachment ring.

6. The air register of claim 4, wherein the first diffuser disc is retained on an inner side thereof by a plurality of ridges extending inwardly from and spaced around the cylindrical wall.

7. The air register of claim 6, wherein the plurality of ridges comprises four equally-spaced ridges.

8. The air register of claim 1, wherein the second diffuser disc includes at least one second diffuser disc aperture and two semi-circular apertures extending therethrough, wherein the two semi-circular apertures are positioned on opposing sides of the second diffuser disc aperture, and the air register further includes:
   a third diffuser disc member coupled to the second diffuser disc and configured to cover the at least one second diffuser disc aperture when in the closed position and be spaced from the second diffuser disc when in the open position,
   wherein the tilt member allows for rotation and tilting of the third diffuser disc.

9. The air register of claim 8, wherein the first, second, and third diffuser discs are circular in shape.

10. The air register of claim 8, wherein the third diffuser disc includes an inner surface, an outer surface, and a third diffuser disc latch that extends from the inner surface and through the second diffuser disc aperture.

11. The air register of claim 8, wherein the third diffuser disc includes a knob, wherein the knob is configured to allow a user to pull the third diffuser disc outwardly from the second diffuser disc and the second diffuser disc outwardly from the first diffuser disc, which arranges the air register in the open position.

12. The air register of claim 8, wherein the tilt ring includes a central circular aperture, the two tilt ring semi-circular apertures, and at least one slot positioned between the two tilt ring semi-circular apertures.

13. The air register of claim 12, wherein when in the open position, airflow moves through the tilt ring semi-circular apertures, through the semi-circular apertures in the second diffuser disc, and around the third diffuser disc.

14. An air register, comprising:
   an attachment member configured to be attached to a surface;
   a first diffuser disc coupled to the attachment member, the first diffuser disc including at least one first diffuser disc aperture extending therethrough;
   a tilt member coupled to the first diffuser disc, wherein the tilt member is a tilt ring that includes a central circular aperture, two semi-circular apertures, and at least one slot positioned between the tilt ring semi-circular apertures;
   a second diffuser disc including at least one second diffuser disc aperture extending therethrough, wherein the second diffuser disc is coupled to the tilt member and configured to cover the at least one first diffuser disc aperture when in a closed position and be spaced from the first diffuser disc when in an open position; and
   a third diffuser disc member coupled to the second diffuser disc and configured to cover the at least one second diffuser disc aperture when in the closed position and be spaced from the second diffuser disc when in the open position,
   wherein the tilt member allows for rotation and tilting of the second diffuser disc and the third diffuser disc.

15. The air register of claim 14, wherein the second diffuser disc includes two semi-circular apertures extending therethrough and are positioned on opposing sides of the second diffuser disc aperture.

16. The air register of claim 15, wherein the second diffuser disc further includes an inner wall and at least one leg extending therefrom, wherein a latch is positioned at an inner end of the at least one leg.

17. The air register of claim 16, wherein the second diffuser disc further includes a detent positioned between the inner end and an outer end of the at least one leg.

18. The air register of claim 17, wherein the at least one leg is configured to extend through the at least one slot of the tilt ring.

19. The air register of claim 18, wherein the third diffuser disc includes an inner surface, an outer surface, a third diffuser disc latch that extends from the inner surface and through the second diffuser disc aperture, and a knob that is configured to allow a user to pull the third diffuser disc outwardly from the second diffuser disc and the second diffuser disc outwardly from the first diffuser disc, which arranges the air register in the open position.

20. An air register, comprising:
   an attachment member configured to be attached to a surface, wherein the attachment member is an attachment ring that includes a cylindrical wall with a lip extending outwardly from a first end thereof, and wherein the cylindrical wall is configured to be inserted into and retained within a cavity, and the lip is configured to abut the surface;
   a first diffuser disc coupled to the attachment member, the first diffuser disc including at least one first diffuser disc aperture that is formed by a cylindrical flange that extends inwardly from the first diffuser disc;
   a tilt member coupled to the first diffuser disc, wherein the tilt member is a tilt ring that includes a central circular aperture, two semi-circular apertures, and at least one slot positioned between the tilt ring semi-circular apertures;
   a second diffuser disc that includes at least one second diffuser disc aperture and two semi-circular apertures extending therethrough, the two semi-circular apertures positioned on opposing sides of the second diffuser disc aperture, wherein the second diffuser disc is coupled to the tilt member and configured to cover the at least one first diffuser disc aperture when in a closed position and be spaced from the first diffuser disc when in an open position; and
   a third diffuser disc member coupled to the second diffuser disc and configured to cover the at least one second diffuser disc aperture when in the closed position and be spaced from the second diffuser disc when in the open position, wherein the third diffuser disc includes an inner surface, an outer surface, a third diffuser disc latch that extends from the inner surface and through the second diffuser disc aperture, and a knob that is configured to allow a user to pull the third diffuser disc outwardly from the second diffuser disc and the second diffuser disc outwardly from the first diffuser disc, which arranges the air register in the open position,
   wherein the tilt member allows for rotation and tilting of the second diffuser disc and the third diffuser disc.

* * * * *